United States Patent
Knebel

(10) Patent No.: US 6,836,359 B2
(45) Date of Patent: Dec. 28, 2004

(54) MICROSCOPE AND SEGMENTING DEVICE FOR A MICROSCOPE

(75) Inventor: Werner Knebel, Hebelstr (DE)

(73) Assignee: Leica Microsystems Heidelberg GmbH, Mannheim (DE)

( * ) Notice: Subject to any disclaimer, the term of this patent is extended or adjusted under 35 U.S.C. 154(b) by 0 days.

(21) Appl. No.: 10/266,005

(22) Filed: Oct. 7, 2002

(65) Prior Publication Data

US 2003/0030900 A1 Feb. 13, 2003

Related U.S. Application Data

(63) Continuation of application No. 09/769,215, filed on Jan. 24, 2001, now abandoned.

(30) Foreign Application Priority Data

Jan. 28, 2000 (DE) .......................................... 100 03 762

(51) Int. Cl.⁷ .......................... G02B 21/06; G02B 21/00
(52) U.S. Cl. ........................ 359/388; 359/385; 359/368
(58) Field of Search ................................ 359/368–390, 359/227–236, 885–892; 250/234, 458.1

(56) References Cited

U.S. PATENT DOCUMENTS

| | | | | |
|---|---|---|---|---|
| 4,109,999 A | * | 8/1978 | Kiyono et al. | 359/389 |
| 4,407,569 A | | 10/1983 | Piller et al. | 359/370 |
| 4,806,776 A | * | 2/1989 | Kley | 250/559.24 |
| 5,127,730 A | * | 7/1992 | Brelje et al. | 356/318 |
| 5,212,589 A | | 5/1993 | Goodman | 359/353 |
| 5,583,342 A | * | 12/1996 | Ichie | 250/459.1 |
| 5,639,666 A | | 6/1997 | Shenkin | 436/63 |
| 5,969,853 A | * | 10/1999 | Takaoka | 359/370 |

* cited by examiner

Primary Examiner—Thong Q Nguyen
(74) Attorney, Agent, or Firm—Simpson & Simpson, PLLC

(57) ABSTRACT

A microscope, in particular for confocal scanning microscopy, having a light source (1) for illuminating an object (6) to be investigated. An optical device (9, 12) is provided for splitting transmitted light (15) passing through the object (6) and fluorescent light (10, 13) produced in the object (6). A segmenting device (17) acting on the transmitted light (15) is configured with regard to a detection-light path which is as short as possible in such a way that the segmenting device (17) is arranged between the object (6) and the light-splitting device (9, 12).

9 Claims, 2 Drawing Sheets

MICROSCOPE AND SEGMENTING DEVICE FOR A MICROSCOPE

CROSS-REFERENCE TO RELATED APPLICATIONS

This application is a continuation of U.S. patent application Ser. No. 09/769,215, filed Jan. 24, 2001, now abandoned, which is incorporated by reference herein, and which claims priority of a German patent application DE P 100 03 762.3 filed Jan. 28, 2000 which is incorporated by reference herein.

FIELD OF THE INVENTION

The invention relates to a microscope. In particular the invention relates to a confocal scanning microscope having a segmenting device.

Furthermore, the invention relates to a segmenting device which is used, in particular, in the abovenamed microscope or confocal microscope.

BACKGROUND OF THE INVENTION

A microscope generally comprises a light source and a focusing optical system with the aid of which the light from the source is focused onto a pinhole stop. In this case, a beam splitter, a scanning device for beam control, a microscope optical system, a detection stop and detectors for detecting detection and/or fluorescent light are provided.

In a confocal microscope, the illuminating light is mostly coupled in via the beam splitter. The focus of the light beam is moved with the aid of the scanning device in a sample plane. For this purpose, it is customary to use two mirrors which are tilted, the deflection axes mostly being perpendicular to one another, such that one mirror deflects in the X-direction and the other deflects in the Y-direction.

It is also possible in a transmitted-light arrangement for the fluorescent light or the transmitted light—the transmission of the exciting light—, for example, to be detected on the condenser side, that is to say on the side of a condenser arranged downstream of the object. The detection-light beam then does not pass via the scanning mirrors to the detector. Such an arrangement is denoted as a non-descanning arrangement.

In order to detect the fluorescent light, there would be a need in the transmitted-light arrangement for a condenser-side detection stop in order—as in the descanning arrangement described—to achieve a three-dimensional resolution. In the case of two-photon excitation, however, it is possible to dispense with a condenser-side detection stop, since the probability of excitation is a function of the square of the photon density or the intensity, which is naturally much higher at the focus than in the neighboring regions. The fluorescent light to be detected therefore originates with high probability in overwhelming proportion from the focusing region, and this renders superfluous further differentiation of fluorescence photons from the focusing region from fluorescence photons from the neighboring regions with the aid of a stop arrangement.

Particularly against the background of a yield of fluorescence photons which is low in any case for two-photon excitation, a non-descanning arrangement in which less light is generally lost on the detection-light path is of interest. Nevertheless, because of the lack of marking in living preparations, cell contours, for example, also cannot be detected sufficiently well in the case of this type of observation of fluorescent light, and so it would be desirable to be simultaneously able to observe the transmitted light, which would permit clear conclusions.

A microscope for simultaneously detecting fluorescent and transmitted light is already known to the applicant from an earlier patent application. The known microscope comprises downstream of a condenser a light-splitting device in the form of at least one color beam splitter which spatially separates or splits the fluorescent light from the transmitted light.

For the purpose of transmitted-light contrast microscopy, in the case of the known microscope the segmenting device required for contrast is arranged in the form of a segment stop in a Fourier plane of the transmitted light downstream of the light-splitting device or downstream of the color beam splitter. This requires a long detection-light path downstream of the light-splitting device, which path also has to be set up in addition to the standard microscope equipment.

BRIEF SUMMARY OF THE INVENTION

It is therefore the object of the present invention to specify a microscope having a detection-light path which is as short as possible and can be implemented with the aid of structurally simple means.

The above object is achieved by a microscope which comprises: a light source for illuminating an object to be investigated, an optical device for splitting transmitted light passing through the object and fluorescent light generated in the object, a segmenting device acting exclusively on the transmitted light, wherein the segmenting device is arranged between the object and the optical device.

It is a further object of the present invention to specify a confocal microscope having a detection-light path which is as short as possible and can be implemented with the aid of structurally simple means.

The above object is achieved by a confocal microscope which comprises: a laser light source for illuminating an object to be investigated, an optical device for splitting transmitted light passing through the object and fluorescent light generated in the object, a segmenting device acting on the transmitted light, wherein the segmenting device is arranged between the object and the optical device.

It is an additional object of the invention to provide a segmenting device which allows a detection-light path to be as short as possible and simple to implement.

The above object is achieved by a segmenting device which comprises: a transparent substrate and a color-selective coating formed on said transparent substrate.

The advantage of the invention is, that an optimized arrangement of the segmenting device solves the above object in a surprisingly simple way. For this purpose, the segmenting device is no longer arranged downstream of the light-splitting device, but between the object and the light-splitting device. A detection-light path, already prescribed by the arrangement of the light-splitting device, between the object and the light-splitting device is employed in this case, in addition, by virtue of the arrangement of the segmenting device on this detection-light path. The creation of an additional detection-light path is thereby avoided.

Consequently, the microscope according to the invention has a detection-light path which is as short as possible with the aid of structurally simple means.

BRIEF DESCRIPTION OF THE SEVERAL VIEWS OF THE DRAWINGS

There are various possibilities of configuring and developing the teaching of the present invention in an advantageous way. For this purpose, reference is made, to the following description of preferred exemplary embodiments of the invention. In the drawings.

DETAILED DESCRIPTION OF THE INVENTION

Figure 1:
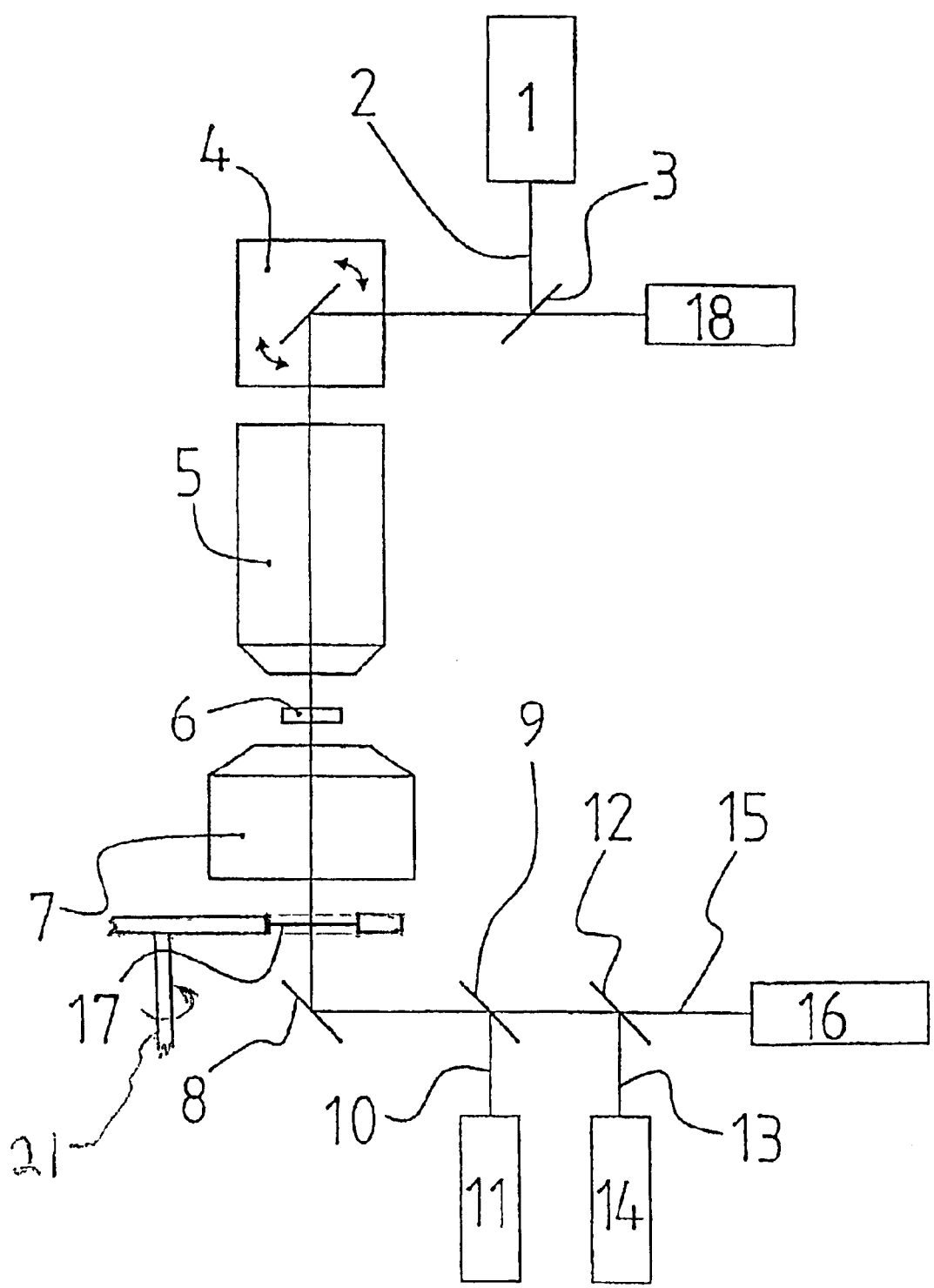
FIG. 1 shows a diagrammatic illustration of an exemplary embodiment of a microscope according to the invention.

FIG. 1 shows an exemplary embodiment of a microscope according to the invention in a diagrammatic illustration. The microscope is a confocal laser scanning microscope. The microscope has a light source 1 designed as a laser. The light source 1 emits an illuminating light beam 2 which is reflected to a scanning device 4 via a main beam splitter 3. The scanning device 4 leads the illuminating light beam 2 through a microscope optical system or an objective 5 via an object 6. Both the transmitted light passing through the object 6 and the fluorescent light produced in the object 6 reach via a condenser 7 and a deflecting mirror 8 a first color beam splitter 9 which splits the spectrally lower-wave region 10 of the fluorescent light and reflects it to a fluorescent-light detector 11. Via a color beam splitter 12, the spectrally higher-wave region 13 of the fluorescent light is reflected to a further fluorescent-light detector 14. The transmitted light 15 reaches a transmitted-light detector 16 arranged in the straight ahead direction.

The microscope consequently has a light source 1 for illuminating an object 6 to be investigated. Furthermore, the microscope has an optical device which is configured as a light-splitting device with two color beam splitters 9 and 12 for splitting transmitted light 15 passing through the object 6 and fluorescent light 10 and 13 produced in the object 6. Finally, the microscope comprises a segmenting device, in the form of a color segment stop 17, which acts on the transmitted light 15. With regard to a detection-light path which is as short as possible, the segmenting device is arranged between the object 6 or the condenser 7 and the light-splitting device 9. The microscope is suitable for transmitted-light contrast microscopy on account of the segmenting device.

The microscope shown in FIG. 1 further has a detector 18 which is arranged on the objective side and is normally not used in transmitted-light contrast microscopy.

Both fluorescent-light detectors 11 and 14 are arranged on the side of the object 6 averted from the light source 1. Furthermore, the transmitted-light detector 16 is arranged on the side of the object 6 averted from the light source 1.

The segmenting device in the form of the color segment stop 17 is arranged in a Fourier plane between the condenser 7 and the light-splitting device 9. An insertion device 21, such as a revolver mechanism or a sliding magazine, can be used to insert the color segment stop 17 into the beam path.

Figure 2:
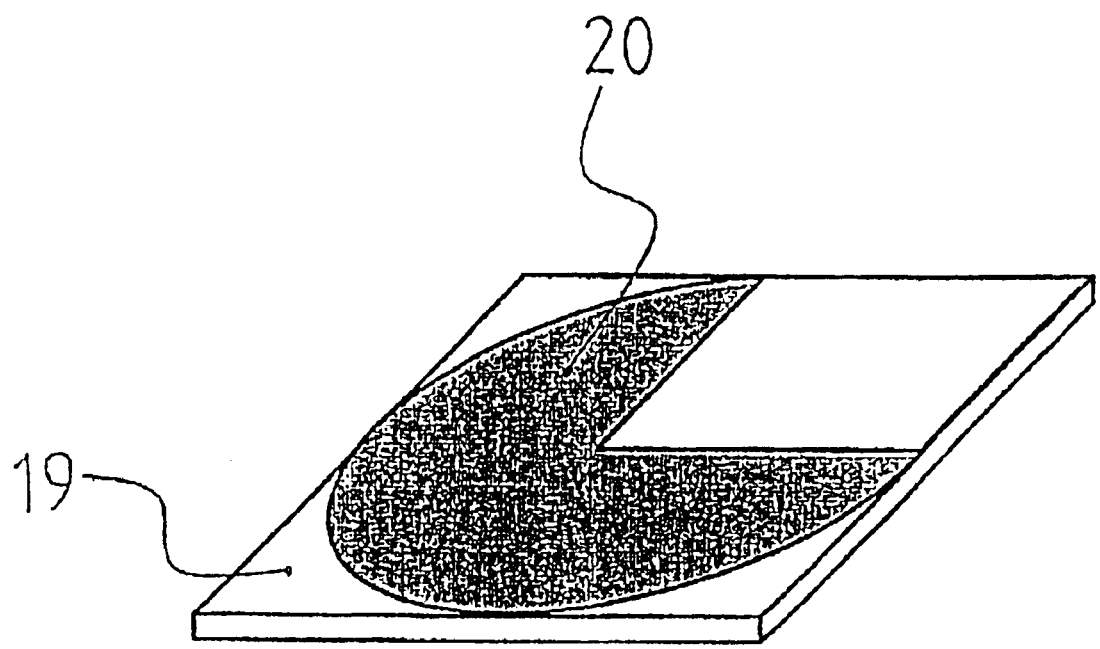
FIG. 2 shows a diagrammatic illustration of an exemplary embodiment of a segmenting device according to the invention with a suitably coated substrate.

FIG. 2 shows a diagrammatic representation of an exemplary embodiment of a segmenting device according to the invention. The segmenting device has a flat substrate 19 with a coating 20. The coating 20 is preferably dielectric and vapor-deposited onto the substrate 19. The coating 20 vapor-deposited onto the transparent substrate is opaque to the transmitted light and transparent to the fluorescent light. In particular, the dielectric coating 20 is transparent to light of wavelengths which are less than 790 nm. Light of higher wavelengths is reflected. The wavelength limit with regard to the transmission and reflection of light can, however, also be at another suitable wavelength.

In a concrete embodiment of the microscope, a condenser for the transmitted light and the fluorescent light could be arranged on the side of the object averted from the light source. The segmenting device could then be arranged in a simple way between the condenser and the optical device, in which case with regard to segmenting which is as effective as possible, it is advantageous to arrange the segmenting device in a Fourier plane between the condenser and the optical device. In any case, the segmenting device could act exclusively on the transmitted light, in which case the fluorescent light can pass through the segmenting device without being influenced.

The device for inserting optical components into a beam path could have a revolver mechanism or a sliding magazine in order to ensure a particularly reliable insertion of the optical components into the beam path. Not only a very reliable, but also a very simple insertion of a segmenting device into the beam path is achieved thereby.

In a particularly versatile way, different segmenting devices could be arranged in the device. Depending on the required investigation methods, it is therefore possible to insert the suitable segmenting device into the beam path.

The most varied components come into consideration as segmenting device. In particular, the segmenting device could have a segment stop, a segment phase stop or a segment phase filter.

In a structurally particularly simple configuration, the segmenting device could have a transparent substrate with a color-selective coating. This implements not only a particularly simple segmenting device, but also an exceptionally thin segmenting device which can be inserted without difficulty into a microscope of the type mentioned at the beginning. The coating could in this case be opaque to the transmitted light and transparent to the fluorescent light.

The coating could advantageously be a dielectric coating. In any case, in a particularly suitable way, the coating could be vapor-deposited onto the substrate. Reliable adhesion of the coating on the substrate can thereby be achieved.

In an alternative refinement, the segmenting device could have a suitably configured color filter. The color filter could, in particular, be tailored in accordance with a known segment stop. Various materials come into consideration as color filter material. In this case, a configuration of the color filter from plastic, preferably plastic film, is particularly easy to handle. However, it is also conceivable for the color filter to be configured from glass.

Figure 3:
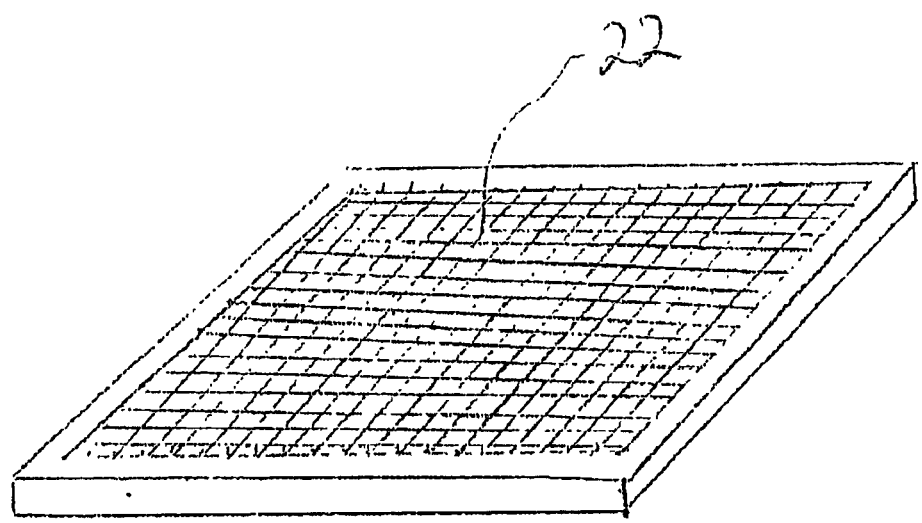
FIG. 3 shows a diagrammatic illustration of an exemplary embodiment of a segmenting device according to the invention with a color LCD matrix.

In a further alternative refinement, the segmenting device could have a color liquid crystal display (LCD) matrix 22 as shown in FIG. 3. Such a color LCD matrix permits variation of the segment or stop shape and variation of the color properties without further redesigning.

In the simplest case, the optically active part of the segmenting device could be arranged perpendicular to an optical axis of the microscope. In a conventional segment stop, the optically active part is formed by an essentially flat region. In the case, for example, of a coated substrate, the coating would be the optically active part of the segmenting device.

In order to avoid reflections which could run back into the light source, the optically active part of the segmenting device could be arranged in a fashion deviating from the perpendicular to an optical axis of the microscope. In this case, the aim is, in particular, a slight deviation which does not influence the optical action of the segmenting device.

The segmenting device or the optically active part of the segmenting device can have different geometrical shapes, depending on the application. In a particularly simple way, the optical device is configured as a light-splitting device and could have at least one color beam splitter. In this case a plurality of color beam splitters could, specifically, be arranged in series to enable different wavelengths or wavelength regions to be split.

As an alternative to this, the light-splitting device could have at least one partially transparent mirror. A bandpass or blocking filter could be arranged downstream of this mirror or these mirrors. In the case of the use of mirrors as splitting component as well, a plurality of such mirrors could be arranged in series, if appropriate with a downstream bandpass or blocking filter. It is also possible thereby to split the fluorescent light into a plurality of spectral regions.

It is possible as an alternative to the use of color beam splitters or mirrors to make use for splitting of a multiband detector which is described, for example, in DE 199 02 625 A1. Such a multiband detector can also be used to split the fluorescent light into a plurality of spectral regions.

With regard to reliable detection of the transmitted light and the fluorescent light, it would be possible to arrange at least one fluorescent-light detector for detecting the fluorescent light and at least one transmitted-light detector for detecting the transmitted light, for the purpose of simultaneously detecting fluorescent and transmitted light, on the side of the object averted from the light source. In a particularly compact refinement of the microscope, the fluorescent light and the transmitted light could be detected in the same detector. With regard to as clear a differentiation as possible, the fluorescent light and the transmitted light could, however, also be detected in different detectors.

A laser could be used in a particularly advantageous way as light source. However, it is also conceivable to use other suitable light sources.

The segmenting device could, for example, operate using the Dodt principle or using the Hoffman principle. In this case, the segmenting device does not—as is usual—comprise a solid opaque segment stop. In the case of a segmenting device designed as a coated substrate, the coating is transparent to the fluorescent light, while it is opaque to the transmitted light—two—or multiphoton exciting light.

With regard to further advantageous refinements and developments of the microscope according to the invention, and to the segmenting device according to the invention, reference may be made for the purpose of avoiding repetition to the general part of the description and to the attached patent claims.

Finally, it may be pointed out expressly that the above-described exemplary embodiments of the microscope according to the invention and of the segmenting device according to the invention serve merely to discuss the teaching claimed but do not limit the latter to these exemplary embodiments.

PARTS LIST

1 Light source
2 Illuminating light beam
3 Main beam splitter
4 Scanning device
5 Objective
6 Object
7 Condenser
8 Deflecting mirror
9 Color beam splitter
10 Wavelength region
11 Fluorescent-light detector
12 Color beam splitter
13 Wavelength region
14 Fluorescent-light detector
15 transmitted-light beam
16 Transmitted-light detector
17 Color segment stop
18 Detector
19 Substrate
20 Coating
21 Insertion device
22 Color LCD matrix

What is claimed:

1. A scanning confocal microscope system comprising: a confocal microscope further comprising, a laser light source (1) for illuminating an object (6) to be investigated using said confocal microscope, an optical device (9, 12) for splitting transmitted light (15) passing through the object (6) and fluorescent light (10, 13) generated in the object (6), a segmenting device (17) selectively acting on the transmitted light (15) and characterized in that the segmenting device (17) has a transparent substrate (19) with a color-selective coating (20), wherein the segmenting device (17) is arranged between the object (6) and the optical device (9, 12) and wherein segmenting device (17) is arranged to pass separately either only fluorescent light or only transmitted light.

2. The microscope system according to claim 1, characterized in that a condenser (7) for the transmitted light (15) and the fluorescent light (10, 13) is arranged on the side of the object (6) averted from the light source (1).

3. The microscope system according to claim 2, characterized in that the segmenting device (17) is arranged between the condenser (7) and the optical device (9, 12).

4. The microscope system according to claim 1, further comprising an insertion device operatively arranged to insert said segmenting device (17) into a beam path transmitted from or generated in the object.

5. The microscope system according to claim 4 wherein said insertion device is a revolving device utilizing circular motion to insert said segmenting device into said beam path.

6. The microscope system according to claim 1, characterized in that the coating (20) is opaque to the transmitted light (15) and transparent to the fluorescent light (10, 13).

7. The microscope system according to claim 1 characterized in that the optical device (9, 12) is a multiband detector.

8. The microscope system according to claim 1 characterized in that the optical device (9, 12) is a color beam splitter arranged prior to the at least one detector (11, 14) for fluorescent light.

9. The microscope system according to claim 1, characterized in that at least one fluorescent light detector (11, 14) for detecting the fluorescent light (10, 13) and at least one transmitted-light detector (16) for detecting the transmitted light (15) are arranged, for the purpose of simultaneously detecting fluorescent and transmitted light (10, 13, 15), on the side of the object (6) averted from the light source (1).

* * * * *